Jan. 28, 1958 C. H. JONES 2,821,569

FOUR PARAMETER TV RECEIVERS

Filed July 28, 1954 5 Sheets-Sheet 1

WITNESSES

Edwin E. Bassler

John J. Callahan

INVENTOR

Charles H. Jones

BY

F. E. Browder

ATTORNEY

Jan. 28, 1958 C. H. JONES 2,821,569

FOUR PARAMETER TV RECEIVERS

Filed July 28, 1954 5 Sheets-Sheet 3

Jan. 28, 1958 C. H. JONES 2,821,569

FOUR PARAMETER TV RECEIVERS

Filed July 28, 1954 5 Sheets-Sheet 4

Jan. 28, 1958 C. H. JONES 2,821,569

FOUR PARAMETER TV RECEIVERS

Filed July 28, 1954 5 Sheets-Sheet 5

United States Patent Office 2,821,569

Patented Jan. 28, 1958

2,821,569

FOUR PARAMETER TV RECEIVERS

Charles H. Jones, Pittsburgh, Pa., assignor to Westinghouse Electric Corporation, East Pittsburgh, Pa., a corporation of Pennsylvania Application July 28, 1954, Serial No. 446,221

11 Claims. (Cl. 178—5.4)

This invention relates to color television receivers, and has as an object to improve the quality of the pictures reproduced by such receivers.

In almost all of the color television receivers having three-color tubes, and used with NTSC or other simultaneous types of signals, the screens of the tubes are composed of dots or lines of red, green and blue phosphors. In such a tube, a dot structure is apparent in the picture when it is examined closely. As a result, horizontal high definition sometimes beats with the dot pattern to give an objectional moire effect. In multiple tube display systems of either the direct view or projection type, horizontal lines are continuous, but the registration problem is serious.

Another deficiency of a system using three color tubes or a single three-gun tube, is the method of reproducing a white spot by superimposing the red, green and blue colors. Such a white spot is subject to color fringing and hue shifts.

By adding a fourth gun to a three gun tube, or a fourth tube to a three tube system, for carrying the broadband brightness signal, and removing the brightness signal from the other guns or tubes, improved pictures, both color and white might be obtained under certain conditions. However, there is one serious objection to such an addition. The signals to one or more of the color reproducers may be negative on certain colors, and since the tubes cannot deliver a negative light output, an incorrect reproduction will result. One way of avoiding supplying negative signals to a color tube would be to supply only the high frequency brightness components to the black and white reproducer, and to add a fixed positive signal to it. An objection to this is that somewhat the same effect would result as if ambient light was added to an ordinary color tube. The saturation of the colors would be reduced.

This invention provides a four color system in which desaturation and chromaticity unabalance do not result from the addition of the fourth color. In one embodiment of this invention, a three color to four color converter takes the smallest of the three color signals and subtracts it from all three signals so that at least one of the three output signals to the color reproducer is always zero. On neutral colored areas (gray shades from white to black) all of the three signals are zero. The output of the three color to four color converter, always positive, is multiplied by three, and added to the high frequency brightness signal (mixed highs), and is applied to the white picture reproducer. Most of the time this sum signal will be positive so that the reproduced picture will be theoretically perfect. On some saturated colors, the high frequency brightness signal may occasionally be larger in amplitude than the output signal of the three color to four color converter, and negative in sign. Slightly improper reproduction will then result, but the same sort of distortion occurs in a three color system. In areas of medium and low saturation (skin tones, for example) the reproduction is perfect and similar to the reproduction of a three color system.

Another object of this invention is to add a white color reproducer to a three color reproducer without causing desaturation or chromaticity unbalance.

Still another object of this invention is to remove the white signals from the three primary color reproducers of a color television receiver, and to add them to a white reproducer without causing desaturation or chromaticity unbalance.

This invention will now be described with reference to the drawings, of which:

Throughout the drawings like reference characters refer to like elements in the various figures.

Figure 1:
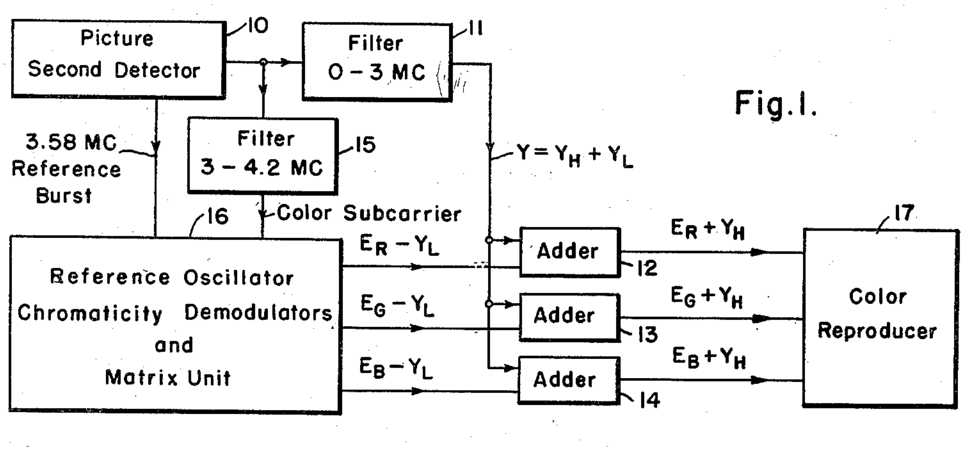
Figure 1 is a block diagram of the color portion of a conventional television receiver.

Referring first to Fig. 1 of the drawings, a conventional NTSC type of color receiver will be described. The NTSC system is based upon the principle of transmitting a wide band luminance signal Y, to which is added a subcarrier modulated by two independent color difference signals of restricted bandwidth such as $E_R-Y_L$ and $E_B-Y_L$, $E_R$ and $E_B$ being red and blue color signals respectively, and $Y_L$ being the low frequency luminance signal. All high frequency detail $Y_H$ is transmitted in monochrome as part of the luminance signal.

The receiver up through the picture second detector is similar to conventional black and white receivers. The luminance signal voltage is separated from the output of the picture second detector 10 by a 0–3 mc. filter 11 from which it appears as Y, the sum of the high ($Y_H$) and the low ($Y_L$) frequency components of brightness, and supplied to the adders 12, 13 and 14. The picture subcarrier is separated from the output of the picture second detector 10 by the 3–4.2 mc. filter 15, and applied to the input of the reference oscillator, chromaticity demodulators and matrix unit 16, to which the 3.58 mc. reference burst is also applied.

The unit 16 has the outputs $E_R$ (red color signal) minus $Y_L$; $E_G$ (green color signal) minus $Y_L$, and $E_B$ (blue color signal) minus $Y_L$. These signals are added in the adders 12, 13 and 14 so that the signals ($E_R+Y_H$), ($E_G+Y_H$) and ($E_B+Y_H$) are produced for application to the picture reproducer 17 which may be a three-gun color tube or three separate color tubes. The addition by the adders 12, 13 and 14 may be accomplished in a three-gun tube as by applying the luminance signal to the control grid of the tube and applying the three color signals to three cathodes of the tube.

A disadvantage of this type of receiver is that imperfect registration of the three colors results in loss of high definition.

Figure 2:
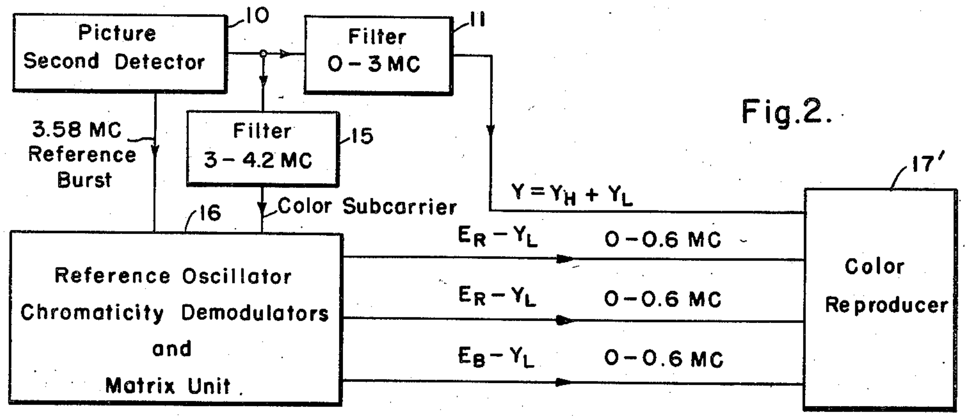
Fig. 2 is a block diagram showing the addition of a white reproducer to the picture reproducer of Fig. 1, with all of the luminosity signal applied to the white reproducer.

Fig. 2 of the drawings illustrates a receiver in which the foregoing disadvantages are overcome by removing the luminosity signals from the color signals and applying them to a fourth reproducer which may be a fourth gun in a single color tube, or a separate tube in a multiple tube system. Fig. 2 is seen to be similar to Fig. 1 except the adders are omitted, and the luminosity signals are applied to a fourth reproducer in the color reproducer 17'.

A disadvantage of the receiver of Fig. 2 is that one or more of the color signals at the picture reproducer 17' may be negative on certain colors, and since the color reproducer cannot deliver negative light output, an incorrect reproduction will result.

Figure 3:
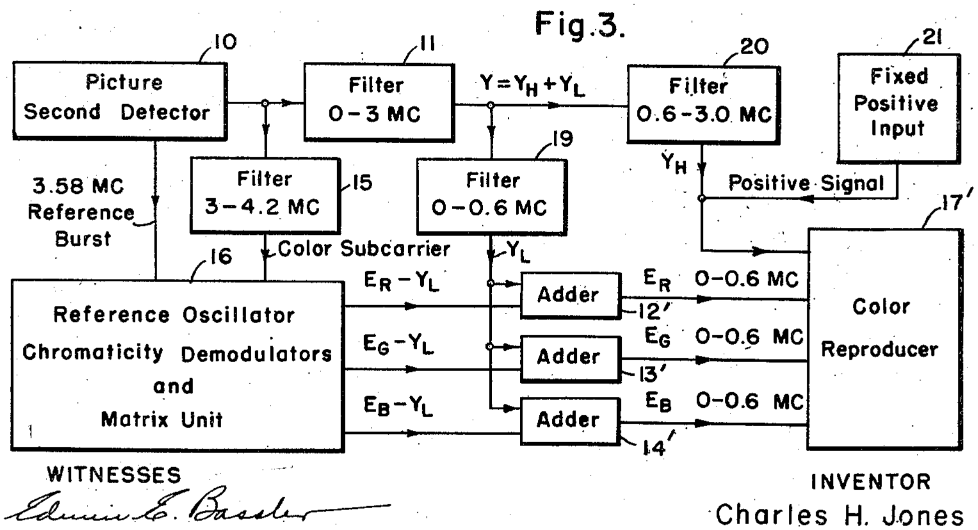
Fig. 3 is a block diagram similar to Fig. 2 except that only the high frequency luminosity signals are applied to the white reproducer.

Fig. 3 of the drawings illustrates how Fig. 2 may be modified so that no negative color signals can be applied to the color reproducer. A 0–0.6 mc. filter 19 is connected between the 0–3 mc. filter 11 and the inputs of the adders 12', 13' and 14' so that only the low frequency components $Y_L$ of the brightness signals are added to the output of the reference oscillator, chromaticity demodulators and matrix unit 16, and applied to the picture reproducer 17'. The 0.6–3.0 mc. filter 20 and the fixed positive voltage source 21 are connected in series between the filter 11 and the white reproducer of the picture reproducer 17' so that the high frequency components $Y_H$ with a fixed positive voltage added thereto are supplied to the white reproducer. The fixed positive voltage is applied to the high frequency brightness signals since the latter are negative as much of the time as they are positive.

A disadvantage of the receiver of Fig. 3 is that adding the fixed positive voltage to the high frequency brightness signals would give somewhat the same effect as adding ambient light to an ordinary color tube. The saturation of the colors would be reduced.

Figure 4:
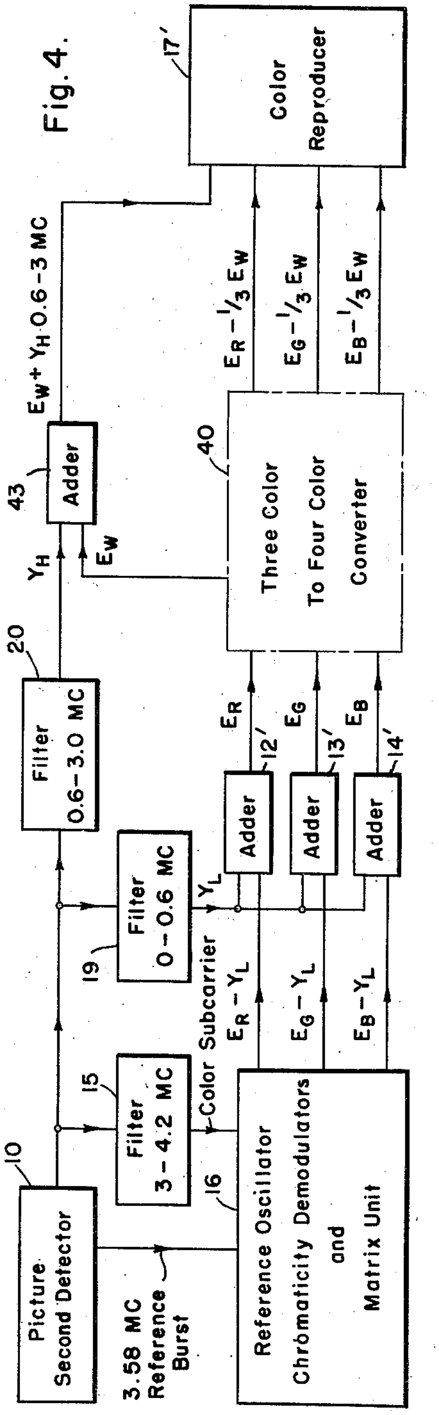
Fig. 4 is a block diagram of the color portion of a color television receiver having four color reproducers and a three color to four color converter embodying this invention.

Fig. 4 of the drawings illustrates an embodiment of this invention in which the disadvantages of the circuits of Figs. 1, 2 and 3 are overcome. It is based upon the fact that colors can be accurately reproduced using four (or more) colors as well as only three. If we assume that the fourth color used is located within a triangle formed by the other three colors (plotted on ICI or CIE diagrams), then the amount of each of the four is not uniquely determined. For example, suppose that a four color additive system using red, green, blue and white is used to produce a desaturated orange. Any of the following proportions could be used:

| | (a) | (b) | (c) | (d) |
|---|---|---|---|---|
| $E_W$ (White) | 0 | 3 | 6 | 1½ |
| $E_G$ (Green) | 3 | 2 | 1 | 2½ |
| $E_R$ (Red) | 4 | 3 | 2 | 3½ |
| $E_B$ (Blue) | 2 | 1 | 0 | 1½ |
| Total Color= | 9 | 9 | 9 | 9 |

However, if we further stipulate that the color shall be formed at the picture reproducer, using as much white as possible, then there will be a unique solution. In this example, it is given by column (*c*). To satisfy such a condition, at least one of the red, green and blue primaries will always be zero.

Assume for example that the color signals have the values of column (*a*). The smallest value $E_B=2$ which is ⅓ of 6, the $E_W$ of column (*c*). Therefore, the smallest color signal=⅓$E_W$. The color signal values may change but this relationship will hold.

The block of Fig. 4 which is legended "three color to four color converter," and is designated by the reference numeral 40, obtains the smallest of the three input signals and subtracts it from all three input signals. Thus, one of the three color signals to the color reproducer is always substantially zero. On neutral colored areas (gray shades from white to black) all of the three primary color signals are zero. An output signal $E_W$, always positive, is added to the high frequency brightness signal $Y_H$ and applied to the white reproducer. On some saturated colors $Y_H$ may occasionally be larger than $E_W$, and negative in sign. Slightly improper reproduction will, of course, result. However, in a three color receiver, a similar sort of distortion occurs. In areas of medium and low saturation (skin tones, for example) the reproduction is correct and identical to the reproduction from a three color system.

Figure 5:
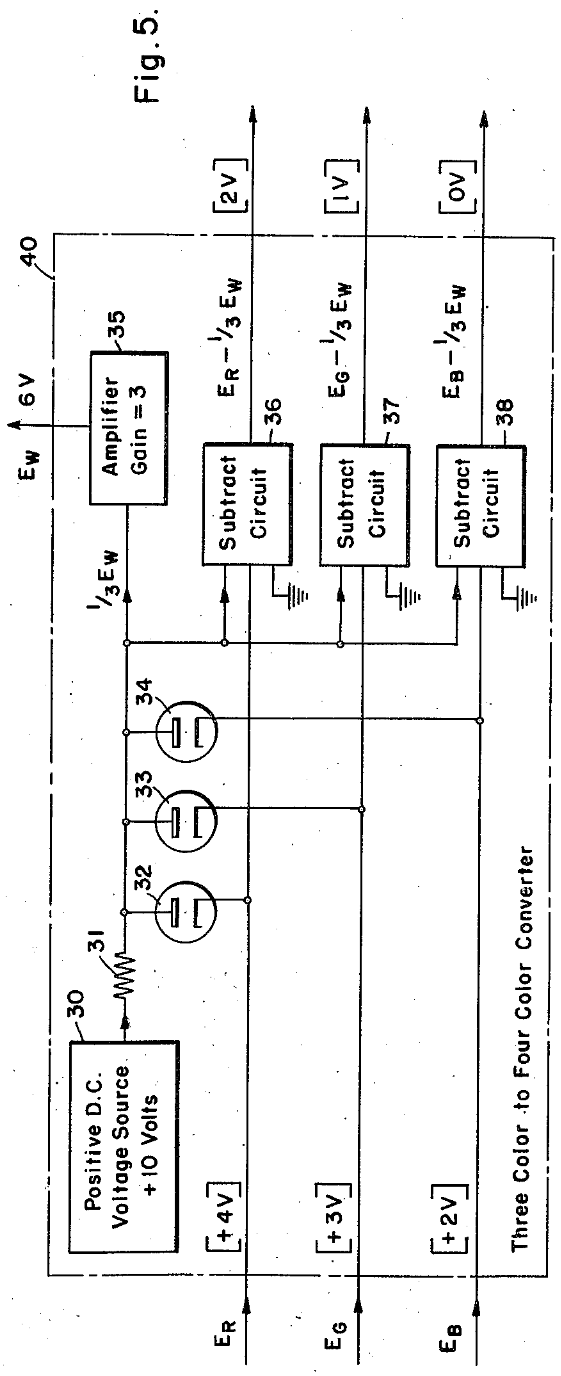
Fig. 5 is a circuit of a three color to four color converter which may be used in the circuit of Fig. 4.

The details of the three color to four color converter are shown in Fig. 5. The numbers in brackets in Fig. 5 illustrate typical voltages at one instant. All of these signals can vary at frequencies up to 0.6 mc.

As in the case of Fig. 3, $Y_L$ is added in the adders 12', 13' and 14' to the output signals from the chromaticity demodulator and matrix unit 16 to provide $E_R$, $E_G$ and $E_B$. A fixed positive signal source 30 is connected through the resistor 31 to the serially connected plate circuits of the diodes 32, 33 and 34 respectively. The output of the diodes 32, 33 and 34 is connected to the amplifier 35 and to the conventional subtract circuits 36, 37 and 38 respectively. The color signals from the outputs of the adders 12', 13' and 14' are connected to the cathode circuits of the diodes 32, 33 and 34, and to the subtract circuits 36, 37 and 38. The subtract circuits are all at ground potential. The value of the resistor 31 is large compared to the forward resistance of the diodes 32, 33 and 34.

The diode 32 will conduct as long as its plate voltage is greater than the value of the color signal $E_R$. The diode 33 will conduct as long as its plate voltage is greater than the value of the color signal $E_G$. The diode 34 will conduct as long as its plate voltage is greater than the value of the color signal $E_B$. The value of the signal across the serially connected plate circuits of the diodes 32, 33 and 34 will go negative until it reaches the smallest value of the three color input signals $E_R$, $E_G$ and $E_B$. Thus the diodes 32, 33 and 34 detect the smallest of the primary color signal voltages. For the voltages illustrated in brackets in Fig. 5, this will correspond to the color signal $E_B$. The signal ⅓ $E_W$, thus derived, is connected to the subtract circuits 36, 37 and 38 and provides two color signals $E_R$ and $E_G$ to the reproducer 17' which are positive and one color signal $E_B$ which is zero.

The brightness signal from the second detector 10 is passed through the 0.6–3 mc. filter 20 into one input of the adder 43. An output of the "three color to four color converter" 40 is $E_W$. $E_W$ is supplied into the other input of the adder 43 in which it is added to the luminosity signal $Y_H$ and supplied to the white reproducer of the color reproducer 17'.

Thus the maximum possible white signal is supplied to the white reproducer with one of the three primary color signals having a value of zero.

Figure 6:
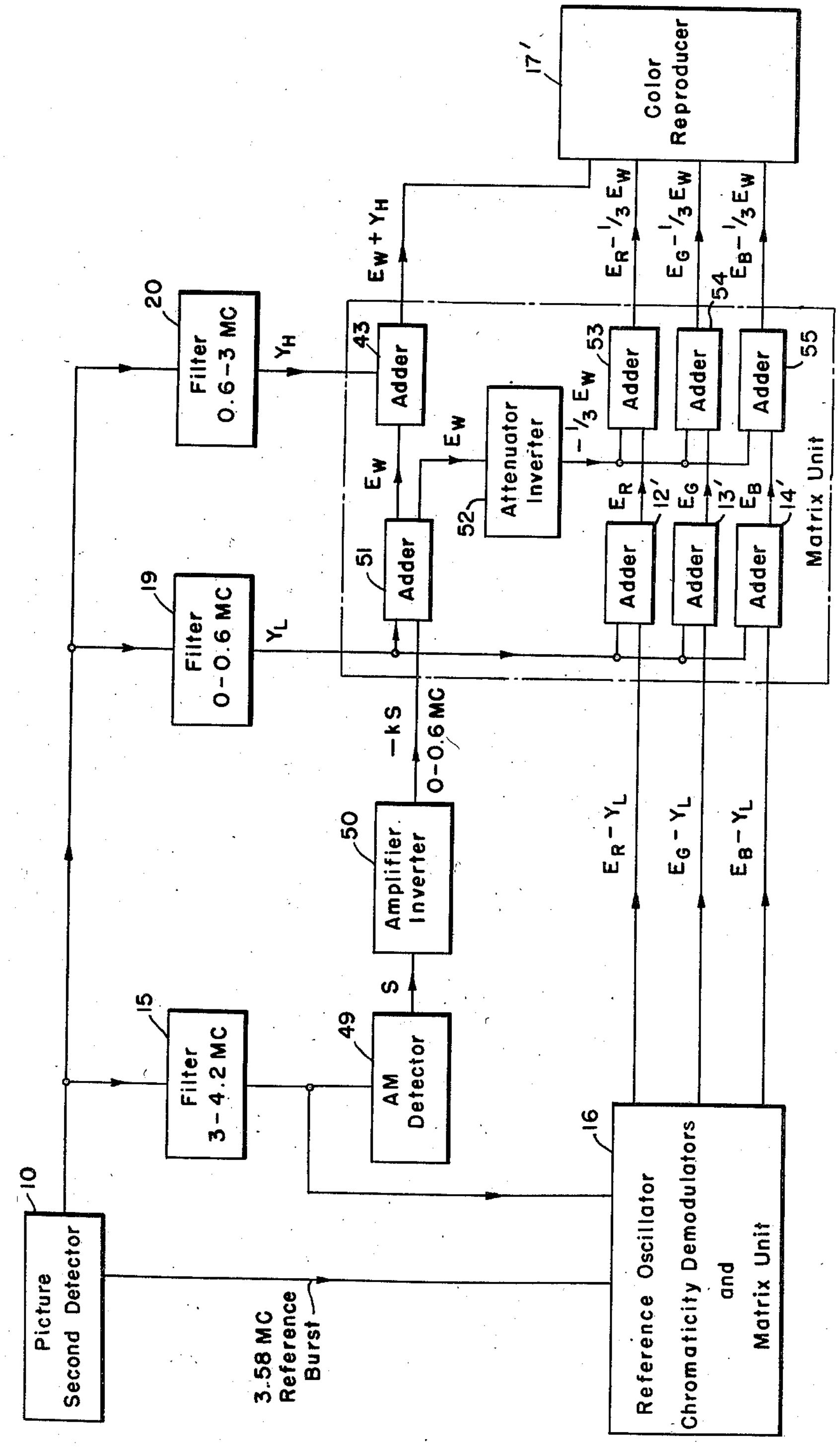
Fig. 6 is a modification of the receiver of Fig. 4.

In the embodiment of the invention illustrated by Fig. 6 of the drawings, advantage is taken of the fact that the nature of the NTSC signal is such that a quantity almost equal to $E_W$ can be obtained simply by detecting the amplitude of the chromaticity signal and subtracting it from the low frequency component of the luminosity signal.

$$E_W \approx (Y_L - kS)$$

where $E_W$=the maximum amount of white that can be used in a four color system at any instant.

$Y_L$=the low frequency component of the brightness signal.

$k$=a positive constant.

$S$=a voltage proportional to the magnitude of the chromaticity signal.

The NTSC signal is of the form $$E_M=Y+S\ \sin\ (wt+\theta_H)$$

where $$w=2\pi f,\ \text{and}\ f=3.58\ \text{mc.}$$

The quantity S is roughly proportional to saturation. This is also true of the proposed "orange-cyan" system. When neutral colors (black, white, and shades of gray) are presented, then S is zero.

The exact way in which gamma is to be applied to brightness and chromaticity is still in a state of flux, so that for the purpose of explanation, a gamma of one is assumed in the received signal and in the display tubes.

Referring now to Fig. 6, the amplitude of the chromaticity signal is detected in the AM detector 49 and supplied as a signal S into the amplifier-inverter 50 where it is amplified by the constant $k$ and inverted. The constant $k$ should be as large as possible without allowing the color signals to the color reproducer ever to go negative. The output of the amplifier-inverter 50, $-kS$, is added in the adder 51 to $Y_L$ to give $E_W$ which is added in the adder 43 to $Y_H$ and supplied to the white reproducer of the picture reproducer 17'.

The $E_W$ signal from the adder 51 is attenuated and inverted in the attenuator-inverter 52 to provide $-\frac{1}{3} E_W$ which is combined in the adders 53, 54 and 55 with $E_R$, $E_G$ and $E_B$ respectively, to give the color signals $E_R-\frac{1}{3}\ E_W$, $E_G-\frac{1}{3}\ E_W$ and $E_B-\frac{1}{3}\ E_W$ respectively, which are supplied to the picture reproducer 17'.

When neutral colors are transmitted, S is zero and so $E_W=Y_L$. The signals to the three color reproducers will be zero since $$E_R=E_G=E_B=\tfrac{1}{3}\ E_W$$

All of the picture information will be supplied to the white reproducer. On saturated colors, $E_W$ will be zero so that only the high frequency signal will be supplied to the white reproducer.

The fourth reproducer need not necessarily be white. It could be any one of a number of shades of white or it need not be white at all. The chromaticity of an average skin tone could be chosen. If this were done, the amounts of signals subtracted from the three color reproducers should be such that the chromaticity of the subtracted color is the same as the chromaticity of the fourth reproducer.

Figure 7:
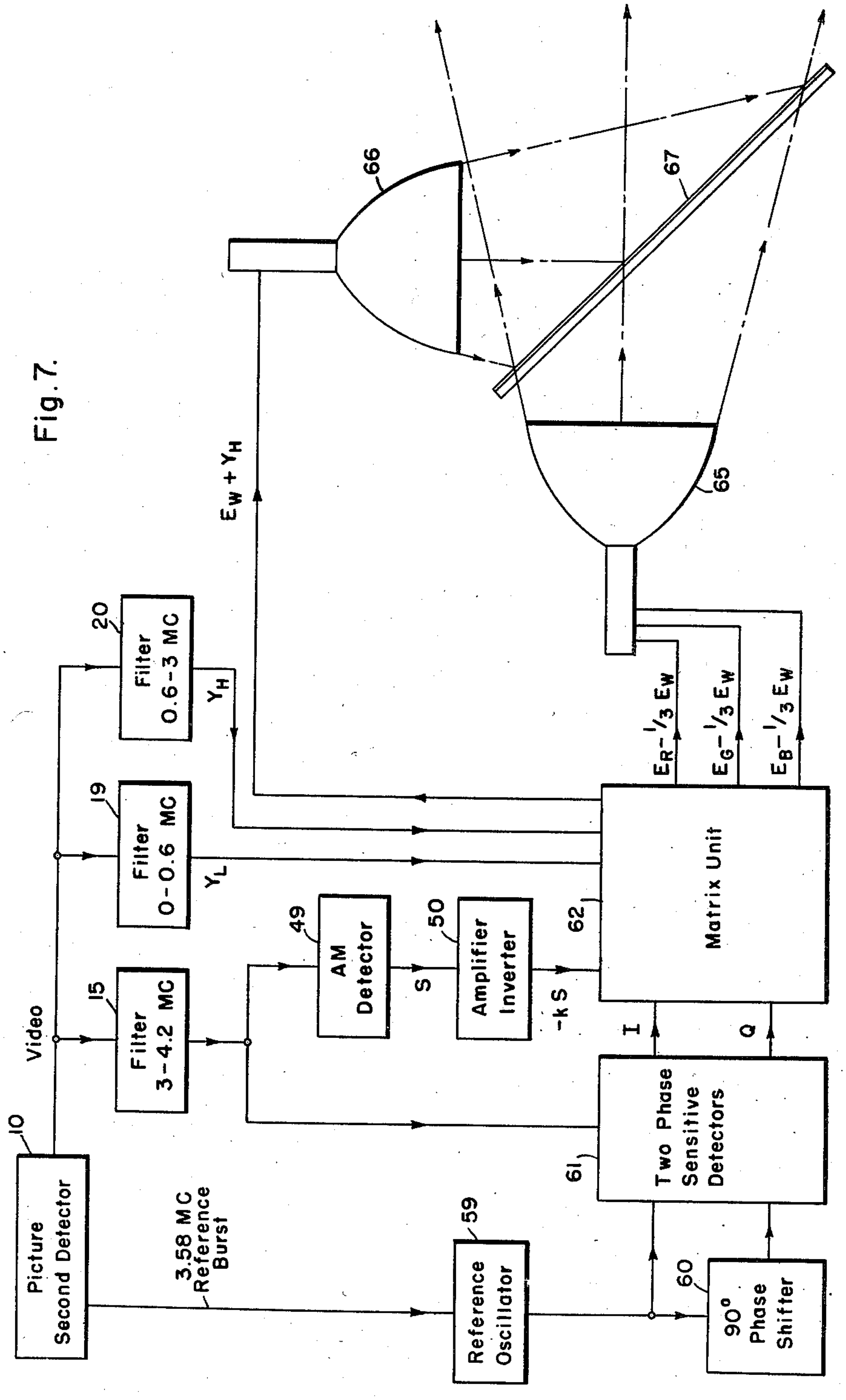
Fig. 7 is a block diagram of another embodiment of this invention using a low definition color tube in combination with a high definition white tube.

This invention is also applicable to a two tube receiver, as illustrated by Fig. 7 of the drawings, in which a low definition color tube 65 and a high definition white tube 66 are used with a half silvered mirror 67 to produce a single image. The tubes could be direct view or projection type tubes.

Fig. 7 shows that a receiver using I and Q demodulators can be used with the proposed system. The I and Q signals are two orthogonal components of the chromaticity signal in the NTSC system. The bandwidth associated with the I signal is greater than that of Q. In the receiver, the color signals from the picture second detector 10 are passed through the 3–4.2 mc. filter 15 to the two phase detector 61. The reference signal is applied to the reference oscillator 59 and then is applied to one of the phase sensitive detectors directly, and through the 90° phase shifter 60 to the other phase sensitive detector, providing voltages for synchronous detection of the color signals.

The amplifier-inverter 50 provides the signal $-kS$ as in Fig. 6, which signal is applied with the two chromaticity signals I and Q from the phase sensitive detectors into the matrix unit 62, to which the low frequency brightness signal $Y_L$ is also applied. In the matrix unit the three color signals are generated; $-\frac{1}{3}\ E_W$ is provided as in Fig. 6 and subtracted from the three color signals before they are applied to the color tube 65, and $E_W$ is provided as in Fig. 6, and added to the high frequency brightness signal $Y_H$ and applied to the white tube 66.

A circuit of the form shown in Fig. 4 or Fig. 6 can also be employed with a two tube display method of the type illustrated by 65, 66 and 67 of Fig. 7. The circuits of Fig. 6 and Fig. 7 do not give as true a value for $E_W$ as the circuit of Fig. 4.

Figure 8:
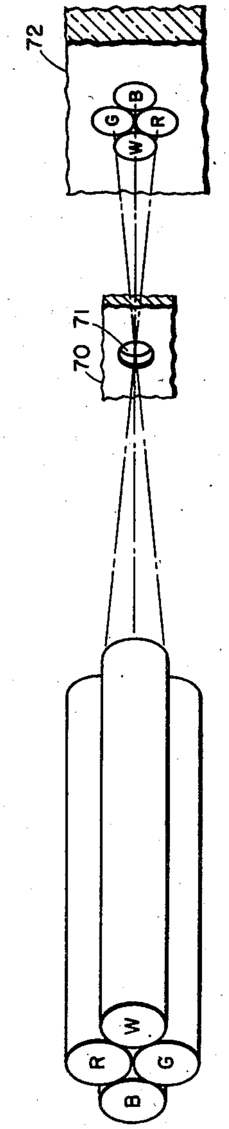
Fig. 8 is a schematic view illustrating how a fourth gun can be added to a three-gun type of color tube, for use in a receiver embodying this invention.
Figure 9:
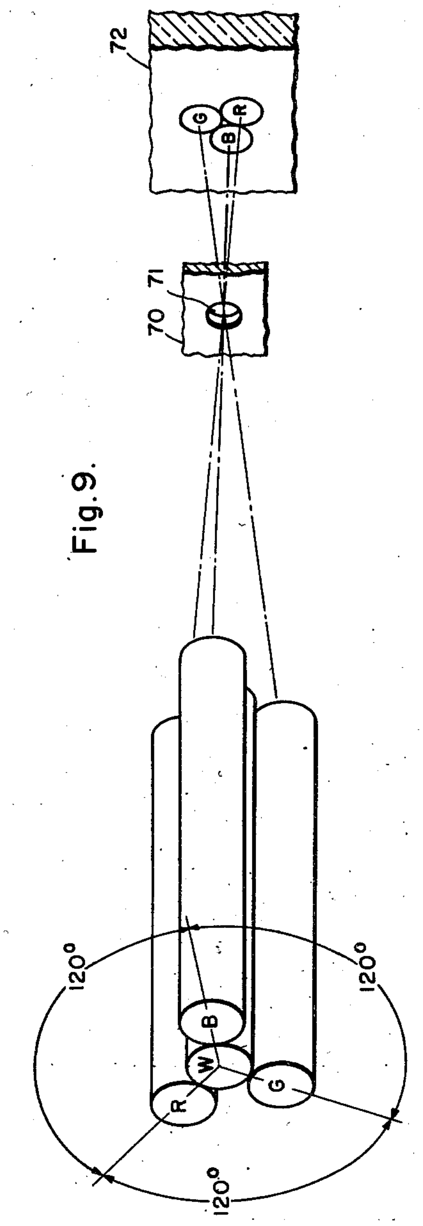
Fig. 9 is a schematic view illustrating another way in which a fourth gun can be added to a three-gun type of color tube.

The three color signals and the white signal, according to this invention, can be applied to four tubes, to a three-gun color tube and a white tube, or to a four gun color tube as illustrated by Figs. 8 and 9 of the drawings.

In Fig. 8, the four guns, red, green, blue and white are arranged in a square or rectangular array so that single horizontal and vertical deflection coils can be used. The four axes may be parallel or convergent. An electrostatic or magnetic field can be used to cause the four beams to converge on a metal mask 70 which contains many fine holes 71 of from two to four mils in diameter. On a glass screen 72 about one-half inch away from the mask 70, a cluster of four phosphor dots is placed behind each hole 71. In operation, the beams from the guns are caused to strike their respective phosphor dots as in a conventional three gun shadow mask tube, except that an additional gun and phosphor dot are added.

In Fig. 9, the three color guns are spaced 120° apart around a central white gun. A cluster of only three dots are used behind each hole 71. The beam from the central gun will go straight through the hole and strike equal amounts of all three primary phosphors. The beams from the other three color guns will converge to strike their respective dots as in the conventional shadow mask three gun tube. A Geer type screen using trihederal surface could also be used with this four gun arrangement.

An advantage of these four-gun tubes over three-gun tubes is that the three color guns need not be in good focus or in good registration with each other or with the white gun. The white gun carries all the high frequency detail and often carries most of the brightness as well. In a three-gun tube, all three guns must hit the same picture element in order to reproduce white. A displacement of one beam in a three-gun tube by only one picture element distance can cause serious cancellation of the brightness detail.

This invention is not limited to receivers in which the four colors are presented simultaneously as in the NTSC system. If the white reproducer is on all the time, the other three colors can be presented at a field sequential, line sequential or dot sequential rate.

While embodiments of the invention have been described for the purpose of illustration, it should be understood that the invention is not limited to the exact circuits and circuit components illustrated and described, as departures therefrom may be suggested by those skilled in the art, without departure from the essence of the invention.

I claim as my invention:

1. A color television receiver comprising three primary color reproducers and a fourth color reproducer; a source of a composite video signal; means for deriving from said composite video signal voltages equal to three low frequency primary color signal voltages less the low frequency brightness signal voltage, the low frequency brightness signal voltage, and the high frequency brightness signal voltage; means for adding the low frequency brightness signal to said first mentioned voltages to provide the low frequency primary color signal voltages; means for providing another voltage equal substantially to the smallest of the low frequency color signal voltages; means for subtracting said other voltage from all three low frequency color signal voltages, and for then applying the difference voltages to said primary color reproducers; and means for providing a voltage equal substantially to three times the voltage of said smallest low frequency color signal voltage and for then adding it to the high frequency brightness signal voltage and for then applying the sum voltage to said fourth color reproducer.

2. A color television receiver comprising three primary color reproducers; a fourth color reproducer; a source of a composite video signal; means including chromaticity demodulating and matricing means for deriving from said composite video signal three voltages equal to the three low frequency primary color signal voltages each less the low frequency brightness signal voltage; means providing from the composite video signal the low frequency brightness signal voltage and the high frequency brightness signal voltage; means for adding the low frequency brightness signal voltage to each of the first mentioned voltages to provide the three low frequency primary color signal voltages; means providing another voltage equal substantially to the smallest of the three low frequency primary color signal voltages; means for subtracting the said other voltage from each of the three low frequency primary color signal voltages and for then applying the difference voltages to the three primary color reproducers; and means for providing a voltage equal substantially to three times the smallest color signal voltage and for adding it to the high frequency brightness signal voltage and for then applying the sum voltage to the fourth color reproducer.

3. A color television receiver comprising three primary color reproducers; a fourth color reproducer; a source of a composite video signal; means including chromaticity demodulating and matricing means for deriving from said composite video signal three voltages equal to the three low frequency primary color signal voltages less the low frequency brightness signal voltage; means providing from the composite video signal the low frequency brightness signal voltage and the high frequency brightness signal voltage; means for adding the low frequency brightness signal voltage to the first mentioned voltages to provide the three low frequency primary color signal voltages; means including minimum signal detectors for detecting the smallest of the low frequency primary color signal voltages and for providing another voltage equal substantially to the smallest of the low frequency color signal voltages; means for substracting the said other voltage from each of the three low frequency primary color signal voltages and for then applying the difference voltages to the three primary color reproducers; and means for providing an additional voltage equal substantially to three times the smallest color signal voltages, for adding the said additional voltage to the high frequency brightness signal voltage, and for then applying the sum of the additional voltage and the high frequency brightness signal to the fourth color reproducer.

4. A color television receiver comprising three primary color reproducers; a fourth color reproducer; a source of a composite video signal; means including chromaticity demodulating and matricing means for deriving from said composite video signal three voltages equal to the three low freequency primary color signal voltages each less the low frequency brightness signal voltage; means providing from the composite video signal the low frequency brightness signal voltage and the high frequency brightness signal voltage; first, second and third adders for adding the low frequency brightness signal voltage to the first mentioned voltages to provide the three low frequency primary color signal voltages; first, second and third diodes connected to the outputs of said adders; first, second and third subtract circuits connected to the output of said diodes; means connecting the outputs of said adders to said subtract circuits; a positive voltage source connected to the serially connected plate circuits of said diodes; an amplifier connected to the output of said diodes; means for applying the sum of the amplified output of said diodes and the high frequency brightness signal voltage to said fourth color reproducer, and means connecting the outputs of said first, second and third subtract circuits to said primary color reproducers.

5. A color television receiver comprising three primary color reproducers, and a fourth color reproducer; means for providing three low frequency primary color signal voltages, a white signal voltage, and a high frequency brightness signal voltage; means for providing another voltage equal substantially to one-third of said white signal voltage; means coupling said other voltage to each of said low frequency primary color signal voltages including means for deriving voltages respectively representing the difference between each of said low frequency primary color signal voltages and said other voltage; means coupling each of said difference voltages to a corresponding primary color reproducer; means for adding the high frequency brightness signal voltage to the white signal voltage; and means coupling the sum of said last-mentioned voltages to said fourth color reproducer.

6. A color television receiver comprising three primary color reproducers and a fourth color reproducer; a source of a composite video signal; means for deriving from said composite video signal three low frequency primary color signal voltages, a high frequency brightness signal voltage, a white signal voltage, and another voltage equal substantially to one third the white signal voltage; means coupling said other voltage to each of said low frequency primary color signal voltages including means for deriving voltages respectively representing the difference between each of said low frequency primary color signal voltages and said other voltage; means coupling said difference voltages to a corresponding primary color reproducer; means for adding the high frequency brightness signal voltage to the white signal voltage; and means coupling the sum of said last-mentioned voltages to said fourth color reproducer.

7. A color television receiver comprising, three primary color reproducers; a fourth reproducer, a source of a composite video signal; means for deriving from said composite video signal three voltages equal substantially to the low frequency components of the three primary color signal voltages, the chromaticity signal voltage, the low frequency brightness signal voltage, and the high frequency brightness signal voltage; means including an amplitude modulation detector for detecting the amplitude of the chromacity signal voltage, inverting it, amplifying it and then adding it to the low frequency brightness signal voltage to produce a white signal voltage; means providing another voltage equal substantially to a third of said white signal voltage; means coupling said other voltage to each of said three voltages including means for deriving voltages respectively representing the difference between each of said three voltages and said other voltage; means coupling each of said difference voltages to a corresponding primary color reproducer; means for adding the white signal voltage to the high frequency brightness signal voltage; and means coupling the sum of said last-mentioned voltages to said fourth color reproducer.

8. A color television receiver comprising three primary color reproducers; a fourth reproducer; a source of a composite video signal; a first phase sensitive detector connected to said source; a 90° phase shifter connected to said source; a second phase sensitive detector connected to said phase shifter; a matrix unit connected to said detectors, said unit providing three low frequency primary color signal voltages; means deriving from said composite video signal the high frequency brightness signal voltage and the chromaticity signal voltage; means including an amplitude modulation detector for detecting the amplitude of the chromaticity signal voltage, inverting it, amplifying it and then adding it to the low frequency brightness signal voltage; means providing another voltage equal substantially to one-third of the white signal voltage; means coupling said other voltage to each of said low frequency primary color signal voltages including means for deriving voltages respectively representing the difference between each of said low frequency primary color signal voltages and said other voltage; means coupling each of said difference voltages to a corresponding primary color reproducer; means for adding the high frequency brightness signal voltage to the white signal voltage; and means coupling the sum of said last-mentioned voltages to said fourth color reproducer.

9. A color television receiver comprising a plurality of color reproducers; a source of a composite video signal; means for deriving from said composite video signal a plurality of low frequency color signal voltages corresponding in number of said reproducers, and a high frequency brightness signal voltage; means providing another voltage equal substantially to the smallest of said low frequency color signal voltages; means coupling said other voltage to each of said low frequency color signal voltages including means for deriving voltages respectively representing the difference between each of said low frequency color signal voltages and said other voltage; means coupling each of said difference voltages to a corresponding color reproducer, another color reproducer; and means for providing a voltage equal substantially to said other voltage multiplied by a number equal to the number of the first-mentioned reproducers, for then adding it to the high frequency brightness signal voltage and for then applying the sum voltage to said other reproducer.

10. A color television receiver comprising a plurality of color reproducers; a source of a composite video signal; means for deriving from said composite video signal a plurality of low frequency color signal voltages equal in number to said reproducers, a high frequency brightness signal voltage, a white signal voltage, and another voltage equal substantially to the white signal voltage divided by a number equal to the number of said reproducers; means coupling said other voltage to each of said low frequency color signal voltages including means for deriving voltages respectively representing the difference between each of said low frequency color signal voltages and said other voltage; means coupling each of said difference voltages to a corresponding color reproducer; another color reproducer; means for adding the high frequency brightness signal voltage to the white signal voltage; and means coupling the sum of said last-mentioned voltages to said other color reproducer.

11. A color television receiver comprising three primary color reproducers; a fourth color reproducer; a source of a composite video signal; means including chromaticity demodulating and matricing means for deriving from said composite video signal three voltages equal to the low frequency components of the three primary color signal voltages each less the low frequency brightness signal voltage; means providing from said composite video signal the chromaticity signal voltage, the low frequency brightness signal voltage and the high frequency brightness signal voltage; means for adding the low frequency brightness signal voltage to each of said first-mentioned voltages to provide the three voltages equal to the low frequency components of the three primary color signal voltages; means including an amplitude modulation detector for detecting the amplitude of the chromaticity signal voltage, inverting it, amplifying it and then adding it to the low frequency brightness signal voltage to produce a white signal voltage; means providing another voltage equal substantially to a third of said white signal voltage; means coupling said other voltage to each of said three voltages equal to the low frequency components of the three primary color signal voltages including means for deriving voltages respectively representing the difference between each of said three voltages and said other voltage; means coupling each of said difference voltages to a corresponding color reproducer; means for adding the white signal voltage to the high frequency signal voltage; and means coupling the sum of said last-mentioned voltages to said fourth color reproducer.

References Cited in the file of this patent

UNITED STATES PATENTS

| | | |
|---|---|---|
| 2,646,463 | Schroeder | July 21, 1953 |
| 2,684,995 | Schroeder | July 27, 1954 |